US011160383B2

(12) United States Patent
Henshaw

(10) Patent No.: US 11,160,383 B2
(45) Date of Patent: Nov. 2, 2021

(54) CONVERTIBLE LOUNGE SOFA AND METHODS OF USE

(71) Applicant: Robert J. Henshaw, Newnan, GA (US)

(72) Inventor: Robert J. Henshaw, Newnan, GA (US)

( * ) Notice: Subject to any disclaimer, the term of this patent is extended or adjusted under 35 U.S.C. 154(b) by 0 days.

(21) Appl. No.: 16/945,825

(22) Filed: Aug. 1, 2020

(65) Prior Publication Data

US 2021/0030161 A1 Feb. 4, 2021

Related U.S. Application Data

(60) Provisional application No. 62/881,791, filed on Aug. 1, 2019.

(51) Int. Cl.
| *A47C 17/04* | (2006.01) |
| *A47C 7/70* | (2006.01) |
| *A47C 7/72* | (2006.01) |
| *A47C 7/62* | (2006.01) |
| *A47C 13/00* | (2006.01) |
| *B64D 11/06* | (2006.01) |

(Continued)

(52) U.S. Cl.
CPC ............ *A47C 17/04* (2013.01); *A47C 1/0355* (2013.01); *A47C 7/622* (2018.08); *A47C 7/70* (2013.01); *A47C 7/725* (2013.01); *A47C 13/00* (2013.01); *A47C 17/86* (2013.01); *B60N 2/32* (2013.01); *B60N 3/004* (2013.01); *B64D 11/0627* (2014.12); *B64D 11/0638* (2014.12); *B64D 11/0641* (2014.12)

(58) Field of Classification Search
CPC ....... A47C 1/0355; A47C 17/04; A47C 17/86; A47C 17/16; A47C 7/622; A47C 7/70; A47C 7/725; A47C 13/00; A47C 13/005; A47C 20/041; B64D 11/0627; B64D 11/0638; B64D 11/0641; B60N 2/32; B60N 3/004; A47B 3/063
USPC ......................................................... 297/118
See application file for complete search history.

(56) References Cited

U.S. PATENT DOCUMENTS

| 1,357,255 A | | 11/1920 | Rogers | |
| 2,866,496 A | * | 12/1958 | Glass | ..................... A47C 17/12 297/113 |

(Continued)

FOREIGN PATENT DOCUMENTS

CA 2280215 A1 10/2000

OTHER PUBLICATIONS

International Search Report and Written Opinion dated Jan. 12, 2021 for corresponding International Application No. PCT/US2020/044676.

*Primary Examiner* — Mark R Wendell
(74) *Attorney, Agent, or Firm* — Mathew L. Grell; Jeffrey C. Watson; Grell & Watson Patent Attorneys LLC

(57) ABSTRACT

A convertible lounge sofa system for seating, lounging, and working having a sofa seat bottom having a dual armrest/headrest positioned on one end, sofa seat bottom is configurable thereto a side facing chaise lounge seat having a back support segment, a center segment, a seat pan segment, and a lower leg support segment, and a sofa seat back configured to be opened, with deployable working surface, a storage feature, a power/data feature, and a lighting feature, and, thus, functions to enable seating configurations that utilize reduced floor space with smaller foot prints, and enable multi-person seating as in 1-2 or more and then conversion into a single person lounge or work seating by rotating 90 degrees.

31 Claims, 16 Drawing Sheets

(51) Int. Cl.
    *A47C 1/0355*     (2013.01)
    *A47C 17/86*     (2006.01)
    *B60N 3/00*     (2006.01)
    *B60N 2/32*     (2006.01)

(56) References Cited

U.S. PATENT DOCUMENTS

| | | |
|---|---|---|
| 2,942,649 A | 6/1960 | Wells |
| 3,041,633 A | 7/1962 | Bendell |
| 3,206,775 A | 9/1965 | Filson |
| 3,337,879 A | 8/1967 | Humphrey |
| 4,533,175 A | 8/1985 | Brennan |
| 5,104,182 A | 4/1992 | Rasnick et al. |
| 5,216,769 A * | 6/1993 | Eakin .................. A47C 20/04 5/174 |
| 5,315,726 A | 5/1994 | Borenstein |
| 5,503,457 A | 4/1996 | Rosado |
| 5,788,324 A | 8/1998 | Shea et al. |
| 6,848,127 B2 | 2/2005 | Inagaki |
| D731,192 S | 6/2015 | Sorel |
| 10,111,529 B2 | 10/2018 | Ray |
| 2012/0297535 A1* | 11/2012 | Kanthasamy ........ A47C 17/162 5/12.1 |
| 2015/0150374 A1 | 6/2015 | Jones |
| 2016/0090181 A1* | 3/2016 | Breuer ............... B64D 11/0641 5/20 |
| 2017/0295941 A1* | 10/2017 | King .................... A47C 7/727 |
| 2018/0360224 A1* | 12/2018 | Cimadamore ....... A47C 20/041 |
| 2020/0323352 A1* | 10/2020 | Rach ................. A47C 1/0355 |

\* cited by examiner

CONVERTIBLE LOUNGE SOFA AND METHODS OF USE

CROSS-REFERENCE TO RELATED APPLICATIONS

To the full extent permitted by law, the present United States Non-provisional Patent Application hereby claims priority to and the full benefit of, U.S. Provisional Application No. 62/881,791, filed on Aug. 1, 2019, entitled "Multifunction Convertible Lounge Sofa and Methods of Use", which is incorporated by reference herein in its entirety.

FIELD OF THE DISCLOSURE

The present disclosure is directed to a convertible lounge sofa system and methods of use thereof. More specifically, the present disclosure is directed to a seating apparatus that is convertible between seating and lounging and having a minimally sized form factor.

BACKGROUND

Various approaches or form factors have been utilized for human seating or laying from a chair or sofa of generally conventional design having a seat, support legs, frame, cushions and a back extending upwardly from the seat in a rigid or hinged configuration between the seat and backrest. One disadvantage or drawback to these approaches is that, these seating configurations take up valuable floor space with large foot prints. Another disadvantage or drawback to these approaches is that, these seating configurations do not enable multi-person seating as in 2 or more and then conversion into a single person lounge or work seating.

Therefore, it is readily apparent that there is a recognizable unmet need for a convertible lounge sofa system and methods of use that may be configured to address at least some aspects of the problems discussed above common to seating for home, business, travel, hospitality industry and guest experiences.

SUMMARY

Briefly described, in an example embodiment, the present disclosure may overcome the above-mentioned disadvantages and may meet the recognized need for a convertible lounge sofa system and methods of use, for seating, lounging, and working having a sofa base mounted to or supported by the floor, a sofa seat bottom supported by said sofa base, said sofa seat bottom having an armrest/headrest positioned on one end, and said sofa seat bottom is configurable thereto a side facing chaise lounge seat having a back support segment, a center segment, a seat pan segment, and a lower leg support segment, a sofa seat back supported by said sofa base and positioned adjacent said sofa seat bottom, said sofa seat back configured to be opened, said sofa back having therein a deployable working surface, a storage feature, a power/data feature, and a lighting feature, wherein said sofa seat back is formed of a lower segment and a height adjustable upper segment, wherein said lower segment is configured having an armrest, and said sofa seat back having a slot therebetween said a lower segment and said height adjustable upper segment to deploy said working surface, and, thus, functions to enable seating configurations that utilize reduced floor space with smaller foot prints, and enable multi-person seating as in 1-2 or more and then conversion into a single person lounge or work seating.

Accordingly, in one aspect, the present disclosure may provide the functionality of a sofa, a chaise style recliner and a deployable working surface into a minimally sized form factor.

Accordingly, in another aspect, the present disclosure may provide seating with a sofa back configured to be opened to reveal a deployable working surface, storage features, power, and lighting features and an armrest surface.

Accordingly, in another aspect, the present disclosure may be configured to support a person using the sofa in a chaise lounge manor (any position between flat bench and upright ninety degree seating).

Accordingly, in another aspect, the present disclosure may be configured to allow the sofa to seat 1-2 or more people in a typical sofa manner or allow a person to sit and turn 90 degrees relative to the seat back in a chaise lounge position.

Accordingly, in another aspect, the present disclosure may be configured to allow the sofa to be used or installed into spaces which otherwise would not have sufficient space to accommodate these functions with the current seating options, in space challenged residential or commercial environments or vehicles.

Accordingly, in another aspect, the present disclosure may be configured for use in business aircraft and various forms of road and rail vehicles where the need for multiuse adaptability is important and smaller foot prints application requirements.

Accordingly, in another aspect, the present disclosure may include any and all dimensional relationships, to include variations in size, material, shape, form, position, function and manner of operation, assembly and use, are intended to be encompassed by the present disclosure.

In an exemplary embodiment of the convertible lounge sofa system may include a sofa, the sofa includes a sofa base, a sofa seat bottom supported by the sofa base, the sofa seat bottom having a dual use armrest/headrest positioned on one end, and a seat back console supported by the sofa base and positioned adjacent the sofa seat bottom, the seat back console having a first lower seat back segment and a second upper seat back segment configured to be opened, the seat back console having therein a deployable working surface, wherein the seat back console is configured having a slot therebetween the first lower seat back segment and the second upper seat back segment to deploy the deployable working surface perpendicular to the seat back console in a closed position.

In another exemplary embodiment of the convertible lounge sofa system may include a convertible sofa to side facing chaise lounge for use by a user to support a head, a torso, a buttocks, an upper leg, a lower leg and feet, the sofa includes a sofa base, a sofa seat bottom supported by the sofa base, the sofa seat bottom having a dual use armrest/headrest positioned on one end, wherein the sofa seat bottom is segmented having a first sofa seat assembly to support the torso, a second sofa seat assembly to support the buttocks, a third sofa seat assembly to support the thigh, and a fourth sofa seat assembly to support the lower leg convertible to the side facing chaise lounge, and a seat back console supported by the sofa base and positioned adjacent the sofa seat bottom, the seat back console having a first lower seat back segment and a second upper seat back segment configured to be opened.

In another exemplary embodiment of the convertible lounge sofa method may include the steps of providing a sofa base, a sofa seat bottom supported by the sofa base, the sofa seat bottom having a dual use armrest/headrest positioned on one end, wherein the sofa seat bottom is segmented having a first sofa seat assembly to support the torso, a second sofa seat assembly to support the buttocks, the second sofa seat assembly is affixed to the sofa base, and the first sofa seat assembly is hinged to the second sofa seat assembly, a third sofa seat assembly to support the thigh, the third sofa seat assembly is hinged to the second sofa seat assembly, a fourth sofa seat assembly to support the lower leg, the fourth sofa seat assembly is hinged to the third sofa seat assembly third sofa seat assembly, the sofa seat bottom convertible to the side facing chaise lounge, a seat back console supported by the sofa base and positioned adjacent the sofa seat bottom, the seat back console having a first lower seat back segment and a second upper seat back segment configured to be opened, tilting the first sofa seat assembly to provide upright support for the torso, tilting the third sofa seat assembly to provide upright support for the upper leg; and tilting the fourth sofa seat assembly to provide downward support for the lower leg.

A feature of the present disclosure may include a split backrest having a lower segment and an upper segment hinged between an open and closed position to provide access to an inner console. The inner console may be lockable to keep items stored inside secured.

A feature of the present disclosure may include utilizing the lower or upper segment of the backrest to provide an arm rest for a user in the chaise lounge position.

A feature of the present disclosure may include a cup holder integrated therein the lower or upper segment of the backrest to hold a cup or beverage.

A feature of the present disclosure may include utilizing the lower or upper segment of the backrest to provide privacy.

A feature of the present disclosure may include utilizing the sofa seat bottom as an armrest/headrest positioned on either end to accommodate a right or left version of a sofa or chaise lounge with symmetrical console.

A feature of the present disclosure may include configuring deployable working surface therethrough a slot between lower and upper segment of the backrest.

A feature of the present disclosure may include configuring deploying working surface via a multi-function mechanism articulating arm or rotational mechanism, 90 or 180 degree pivot, or simply plug working surface into a slotted holder, or the like.

A feature of the present disclosure may include configuring deploying working surface as a docking station, keyboard, laptop, tablet, reading material surface, eating or drinking surface, work surface, or the like.

A feature of the present disclosure may include utilizing the lower segment of the backrest to house some or all of the mechanism used to adjust/convert the sofa seat bottom segments into the chaise lounge position. The mechanism could be a manual or powered solutions.

These and other features of the convertible lounge sofa system and methods of use will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present convertible lounge sofa system and methods of use will be better understood by reading the Detailed Description of the Preferred and Selected Alternate Embodiments with reference to the accompanying drawing Figures, in which like reference numerals denote similar structure and refer to like elements throughout, and in which.

Figure 1:
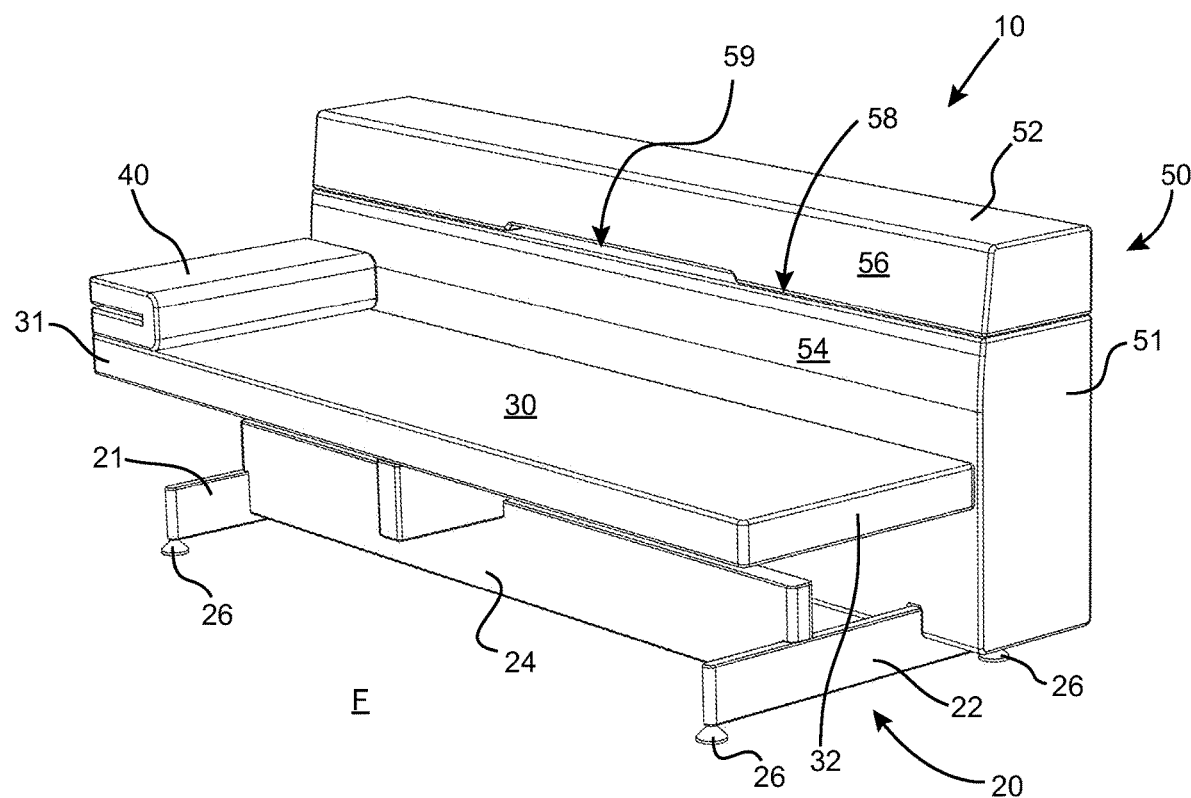
FIG. 1 is a perspective view of the convertible lounge sofa system according to select embodiments of the instant disclosure, shown in a sofa configuration with seat back closed.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in FIGS. 1, 2, 3, 4, 5, 6, 7, 8, 9, 10, 11A, 11B, 12, 13, 14 and 15 specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to FIGS. 1-6, by way of example, and not limitation, there is illustrated an example embodiment of convertible lounge sofa system 10, according to this select embodiment. Convertible lounge sofa system 10 may be utilized to provide the functionality of a sofa, a chaise style recliner, and a deployable working surface into a minimally sized form factor. In this select embodiment, convertible lounge sofa system 10 may include sofa base 20 mounted to or supported by the floor F. Sofa base 20 may include center beam 24 and two perpendicular side beams 21, 22 preferably center beam 24 may be center connected thereto side beams 22, 24 to form an elongated sturdy base, such as in an H-shape configuration. Moreover, two perpendicular side beams 21, 22 may include a pair of leveling foot pads, such as leveling foot pads 26 that rotationally extend between two perpendicular side beams 21, 22 and floor F to enable height adjustment, nonskid, and leveling thereof convertible lounge sofa system 10. It is contemplated herein that other configurations of sofa base 20 may be utilized herein.

Convertible lounge sofa system 10 may include a seat bench, such as sofa seat bottom assembly 30 supported by and removeably affixed to sofa base 20, and more specifically supported by and removeably affixed to center beam 24 of sofa base 20. Sofa seat bottom assembly 30 may be dimensioned to allow seating for one to four or more people in series in a typical flat planar seating mode. Sofa seat bottom assembly 30 includes first sofa seat end 31 and second sofa seat end 32. Moreover, sofa seat bottom assembly 30 may include a raised end, such as dual use armrest/headrest 40, which may be positioned or removably affixed proximate first sofa seat end 31 and/or second sofa seat end 32. It is contemplated herein that sofa seat bottom assembly 30 may be configured to be detached from sofa base 20. This feature enables sofa seat bottom assembly 30 to be installed as either a right or left hand armrest/headrest 40 orientation. It is further contemplated herein that sofa seat bottom assembly 30 may have dual use armrest/headrest 40 positioned on either end to accommodate a right or left version of a sofa or chaise lounge with symmetrical console.

Convertible lounge sofa system 10 may include a backrest, such as seat back console 50 supported by and removeably affixed to sofa base 20, and more specifically supported by and removeably affixed to side beams 21, 22 of sofa base 20. Seat back console 50 may include a lower segment or section, such as first lower seat back segment 51 and an upper segment or section, such as second upper seat back segment 52, wherein second upper seat back segment 52 may be hingedly opened or disconnected therefrom first seat back segment 51. It is contemplated herein that padding or front surface 54, 56 of first lower seat back segment 51 and second upper seat back segment 52 in a closed or connected position may be aligned to form a comfortable continuous upright surface thereto seat back console 50. Moreover, first lower seat back segment 51 or second upper seat back segment 52 may include front edge 58 and front edge 58 may include a cutout, such as slot 59 configured as handle or hand entry to enable pivot of a hinged second upper seat back segment 52 or lift second upper seat back segment 52 therefrom first lower seat back segment 51 to open seat back console 50 to the open console position.

In use, sofa seat bottom assembly 30 and seat back console 50 form a sofa seat and backrest for convertible lounge sofa system 10.

It is recognized herein that convertible lounge sofa system 10 may be used or installed into spaces which otherwise would not have sufficient space to accommodate these functions with the current state of the art. Besides use in space challenged residential or commercial environments convertible lounge sofa system 10 could also be configured into business aircraft and various forms of road and rail vehicles where the need for multiuse adaptability is important and small footprint requirements are necessitated.

Referring again to FIGS. 2 and 4, by way of example, and not limitation, there is illustrated an example embodiment of convertible lounge sofa system 10, according to this select embodiment with second upper seat back segment 52 shown in an open position. First lower seat back segment 51 may include a slider connection or rotational connector, such as seat back hinge assembly 60. Seat back hinge assembly 60 may include first seat back hinge extension 61A and second seat back hinge extension 62A, each extending vertically up therefrom and positioned opposite one another on first seat back segment 51. Moreover, seat back hinge assembly 60 may include first seat back hinge arm 61B and second seat back hinge arm 62B, each extending down therefrom and positioned opposite one another on second seat back segment 52. In use, first seat back hinge extension 61A and first seat back hinge arm 61B, and second seat back hinge extension 62A and second seat back hinge arm 62B, respectively may be pinned via pin 63 or rotationally coupled to seat back hinge assembly 60 and enable second upper seat back segment 52 to hinge or rotate about first lower seat back segment 51 between an open position and a closed position. The inner console may be lockable via a lock between first lower seat back segment 51 and second upper seat back segment 52 to keep items stored inside secured.

It is contemplated herein that second upper seat back segment 52 may hinge from first lower seat back segment 51 by hinging on the upper edge of the sofa back along or traverse (seat back hinge assembly traverses) the longitudinal axis of first seat back segment 51.

Figure 10:
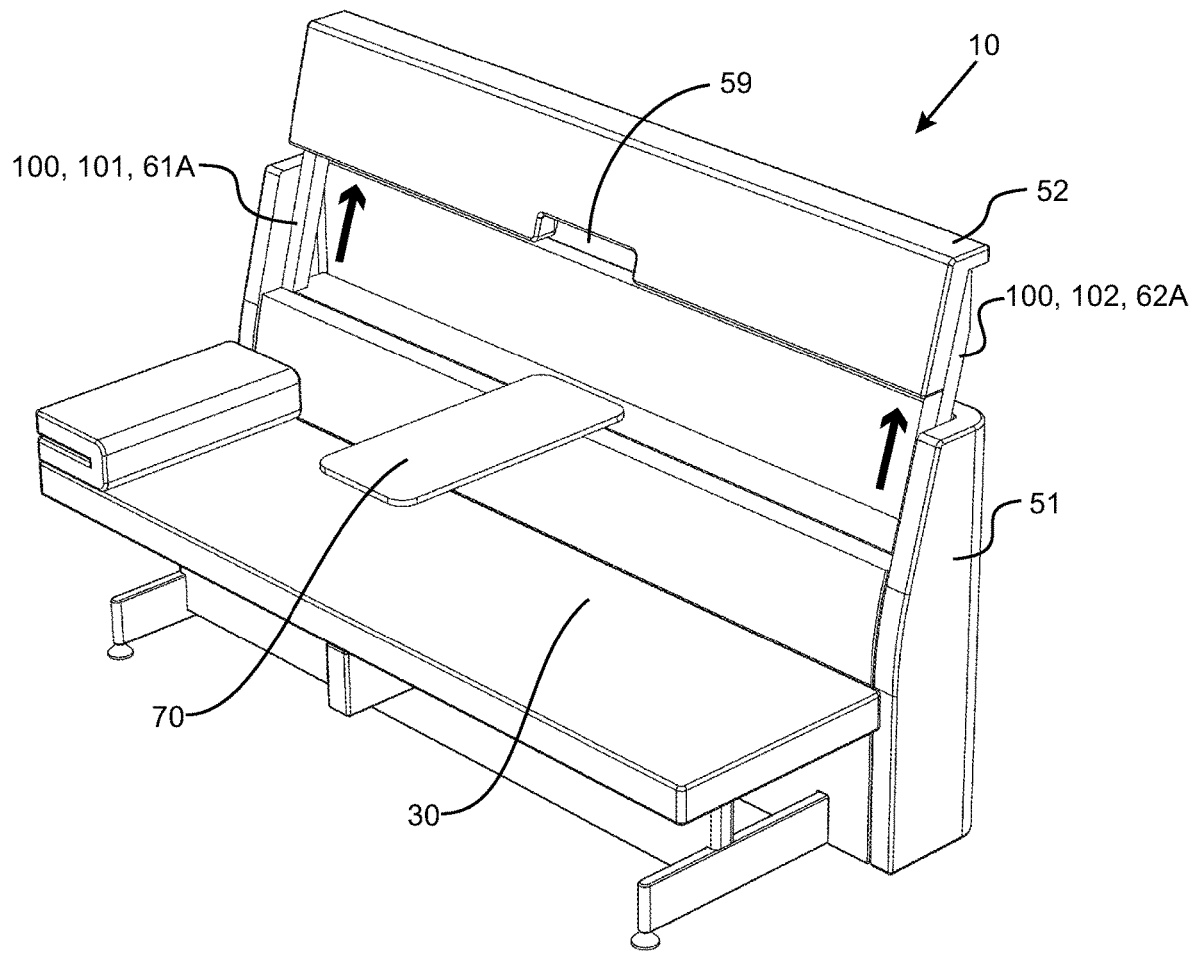
FIG. 10 is a perspective view of the convertible lounge sofa system according to select alternate embodiments of the instant disclosure, shown in a sofa configuration with work station deployed and seat back open.

It is further contemplated herein that second upper seat back segment 52 may separate from first lower seat back segment 51 by lifting second upper seat back segment 52 upwards from first lower seat back segment 51 using either linear bearing, linear linkage assembly, or a four bar style linkage assembly, shown in FIG. 10, such as between seat back extension 61A/62A and seat back arm 61B/62B. Furthermore, seat back extension 61A/62A may include stop slot 64 which limits the rotation or over rotation of second upper seat back segment 52.

Figure 2:
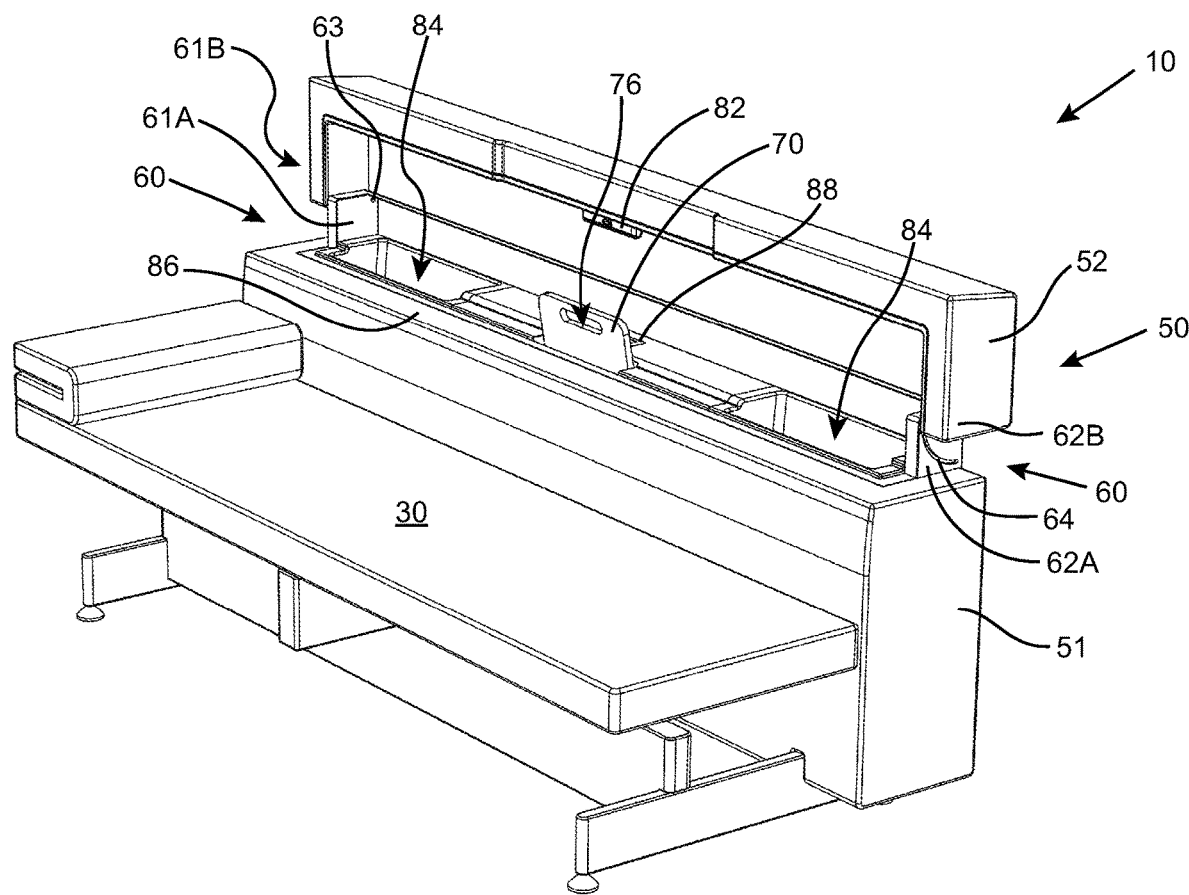
FIG. 2 is a perspective view of the convertible lounge sofa system according to select embodiments of the instant disclosure, shown in a sofa configuration with seat back open.
Figure 3:
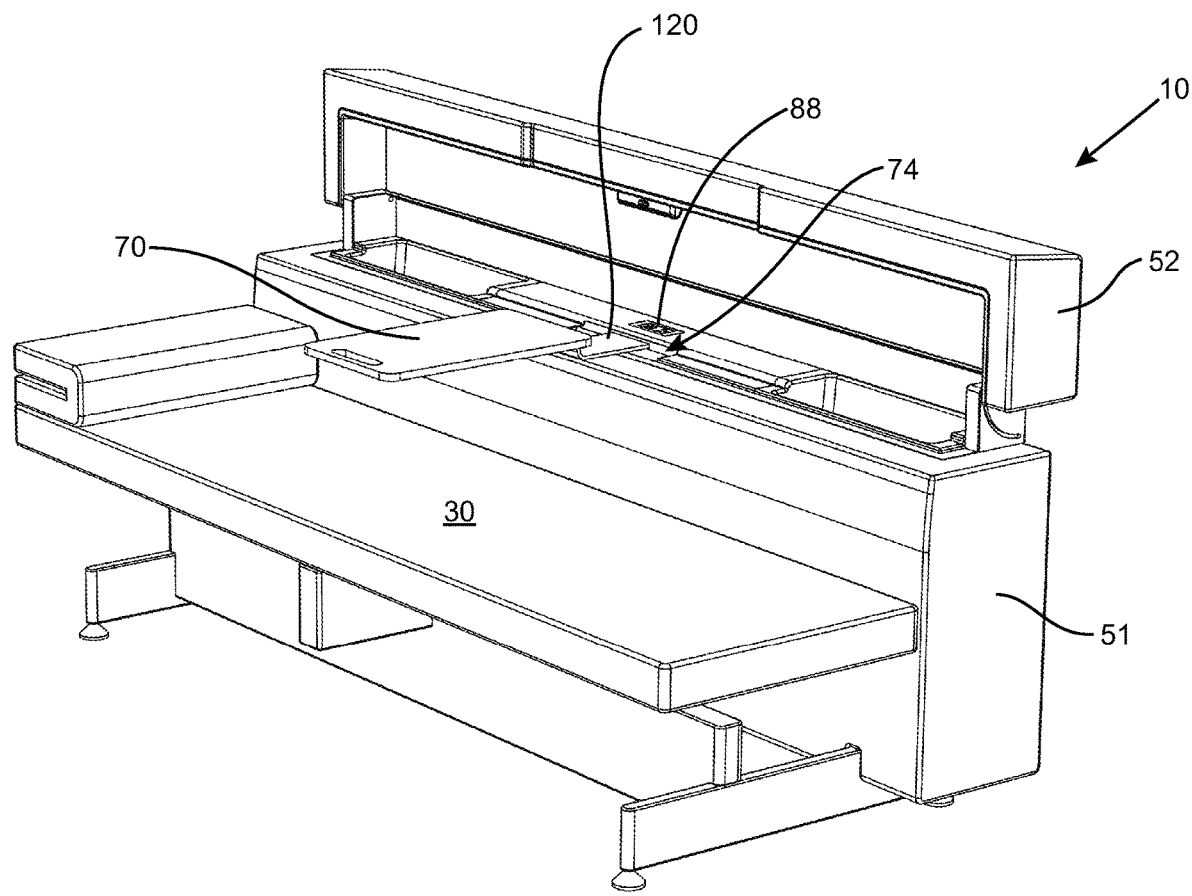
FIG. 3 is a perspective view of the convertible lounge sofa system according to select embodiments of the instant disclosure, shown in a sofa configuration with work station deployed.
Figure 4:
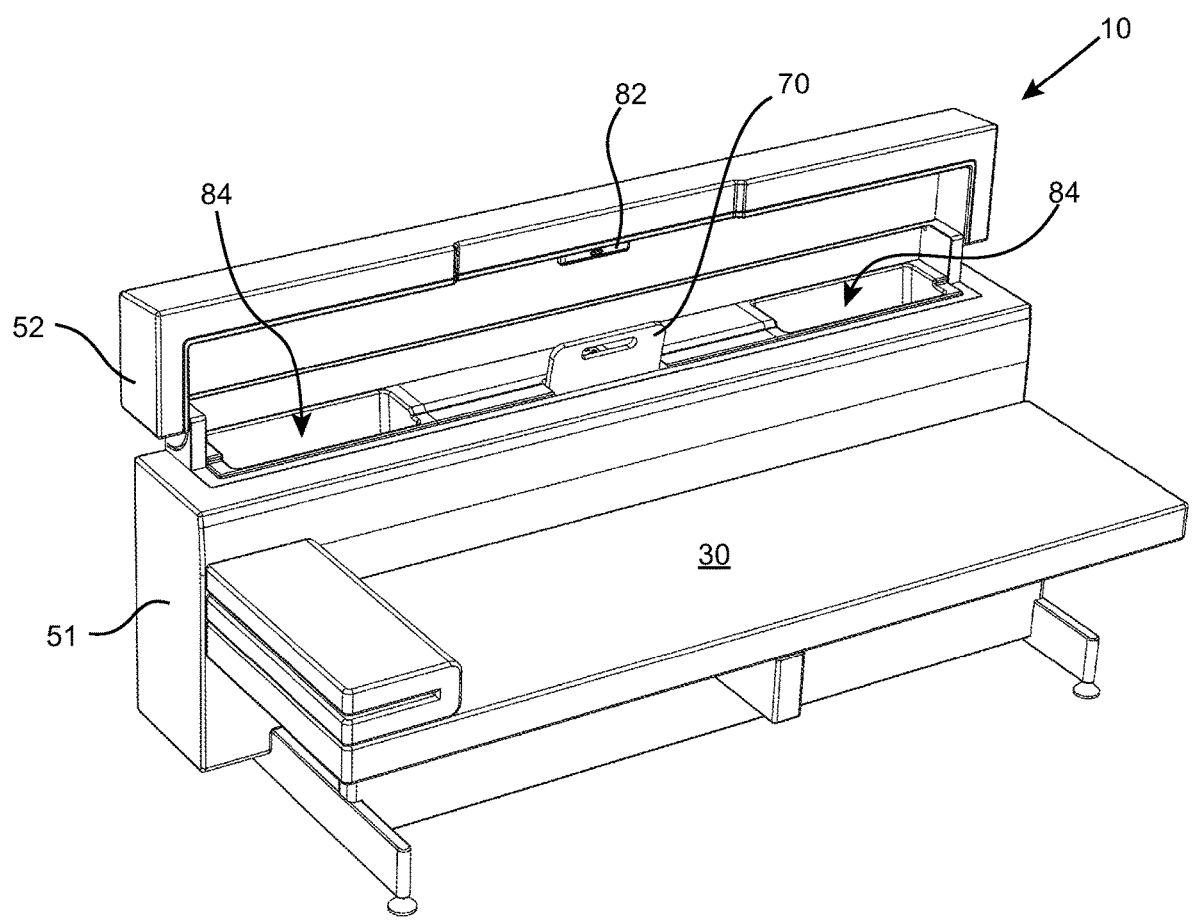
FIG. 4 is a top perspective view of the convertible lounge sofa system according to select embodiments of the instant disclosure, shown in a sofa configuration with seat back open.
Figure 5:
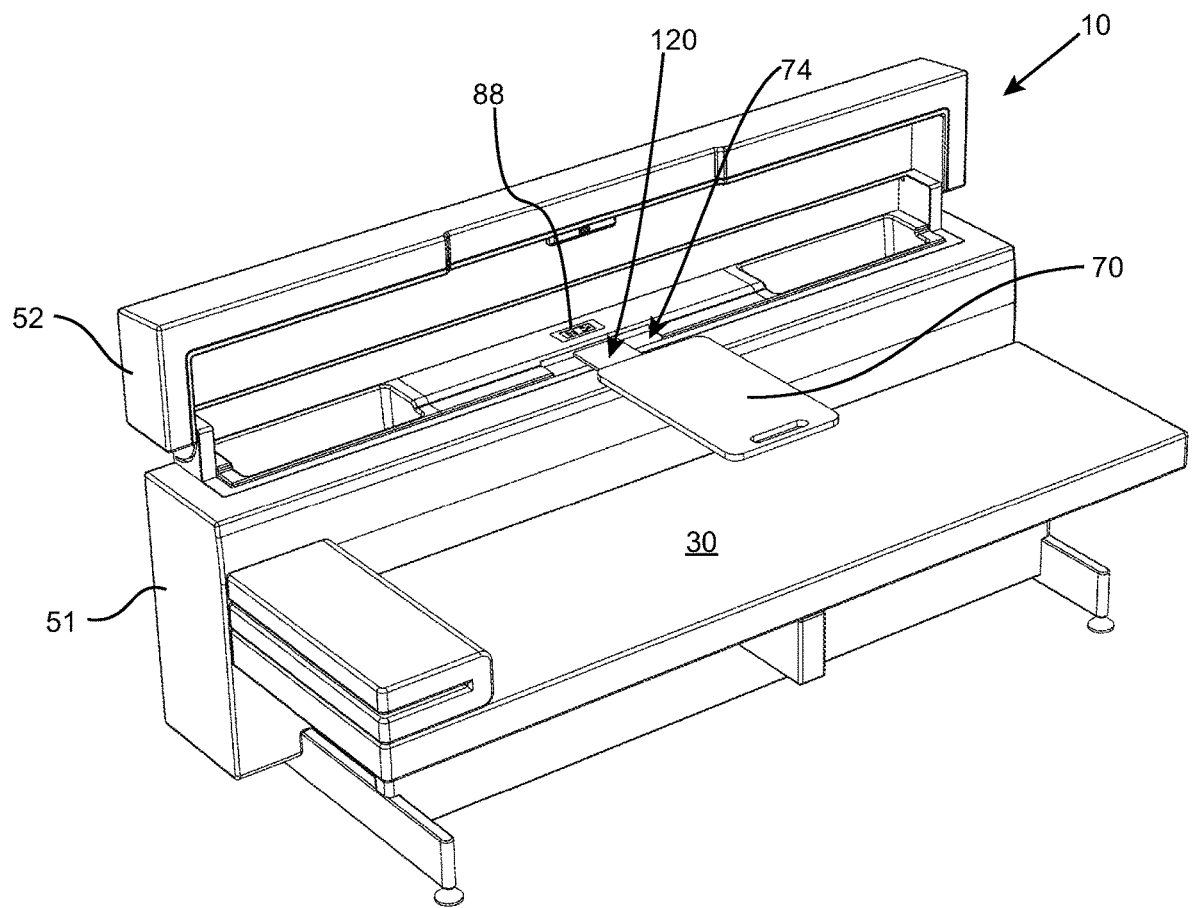
FIG. 5 is a top perspective view of the convertible lounge sofa system according to select embodiments of the instant disclosure, shown in a sofa configuration with work station deployed.
Figure 6:
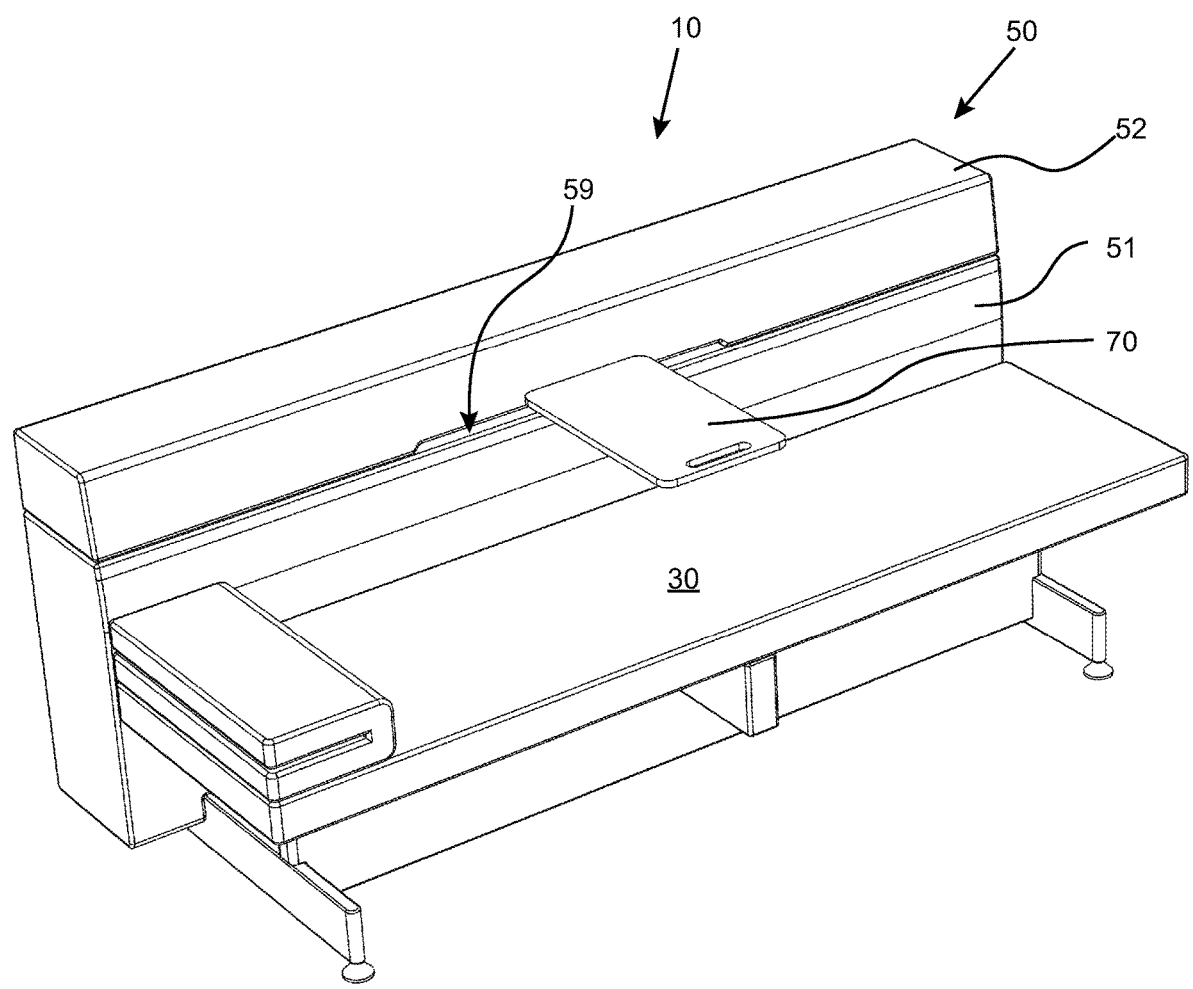
FIG. 6 is a top perspective view of the convertible lounge sofa system according to select embodiments of the instant disclosure, shown in a sofa configuration with work station deployed and seat back closed.

Furthermore, FIG. 2, by way of example, and not limitation, illustrates additional seat back console 50 features, such as a retractable or positionable surface, such as deployable work surface 70 shown stowed in work surface storage pocket 74. Inner console storage pockets 84 configured therein first lower seat back segment 51 may include first seat back segment armrest 86, lighting features 82 to illuminate seat back console 50, storage pockets 84, and deployable work surface 70, power/data port feature 88, such as AC & USB power, data ports, chargers, cup holder, etc. Deployable work surface 70 may be deployed by pulling up and folding deployable work surface 70 out of seat back segment 51 or the like ways to deploy deployable work surface 70. Deploy deployable work surface 70 may include handle 76 positioned proximate front end of deploy deployable work surface 70 to facilitate deployment.

It is contemplated herein that second upper seat back segment 52 in the open position may provide enhanced privacy. It is recognized herein that lighting features 82, power/data port feature 88 which are centrally located in seat back console 50 but in alternative embodiments could be located in various positions in seat back console 50.

Referring again to FIGS. 3 and 5, by way of example, and not limitation, there is illustrated an example embodiment of convertible lounge sofa system 10, according to this select embodiment with second upper seat back segment 52 shown in an open position. First lower seat back segment 51 may include support structure, such as articulating arm 120 having first arm end and second arm end, where first arm end may be mounted or affixed (affix) to first lower seat back segment 51 and second arm end may extend from first lower seat back segment 51 and be affixed (affix) to deployable work surface 70. Preferably deployable work surface 70 is deployed from and stowed (stow) in work surface storage pocket 74 in first lower seat back segment 51 proximate sofa seat bottom assembly 30, therebetween first sofa seat end 31 and second sofa seat end 32, and approximately perpendicular to seat back console 50 or approximately parallel to sofa seat bottom assembly 30.

It is contemplated herein that deployable work surface 70 may be deployed via sliding, pivoting, rotating mechanisms, detached and plugged into a slot, like work surface storage pocket 74.

Referring again to FIG. 6, by way of example, and not limitation, there is illustrated an example embodiment of convertible lounge sofa system 10, according to this select embodiment with second upper seat back segment 52 shown in a closed position, in the sofa mode. First lower seat back segment 51 or second upper seat back segment 52 may include front edges 58 having a cutout, such as slot 59 configured to enable deployable work surface 70 to extend from first lower seat back segment 51 or second seat back segment 52, therebetween proximate first sofa seat end 31 and second sofa seat end 32, and approximately perpendicular to seat back console 50 or approximately parallel to sofa seat bottom assembly 30.

It is contemplated herein that deployable work surface 70 may be deployed with articulating arm 73 traveling or extending through slot 59. In this mode, deployable work surface 70 may support beverages, snacks and/or electronics in the typical sofa mode.

Figure 7:
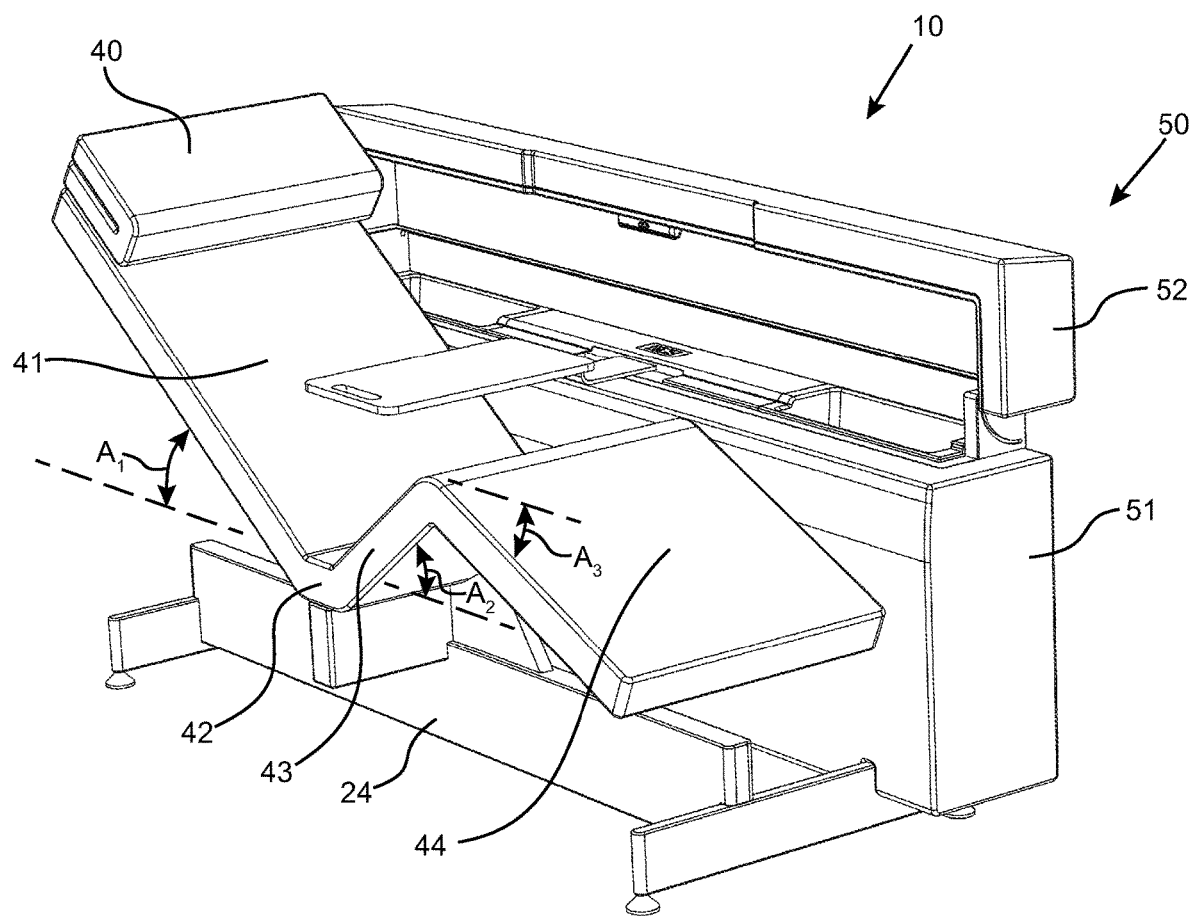
FIG. 7 is a top perspective view of the convertible lounge sofa system according to select embodiments of the instant disclosure, shown in a chaise lounge configuration with work station deployed and seat back open.
Figure 8:
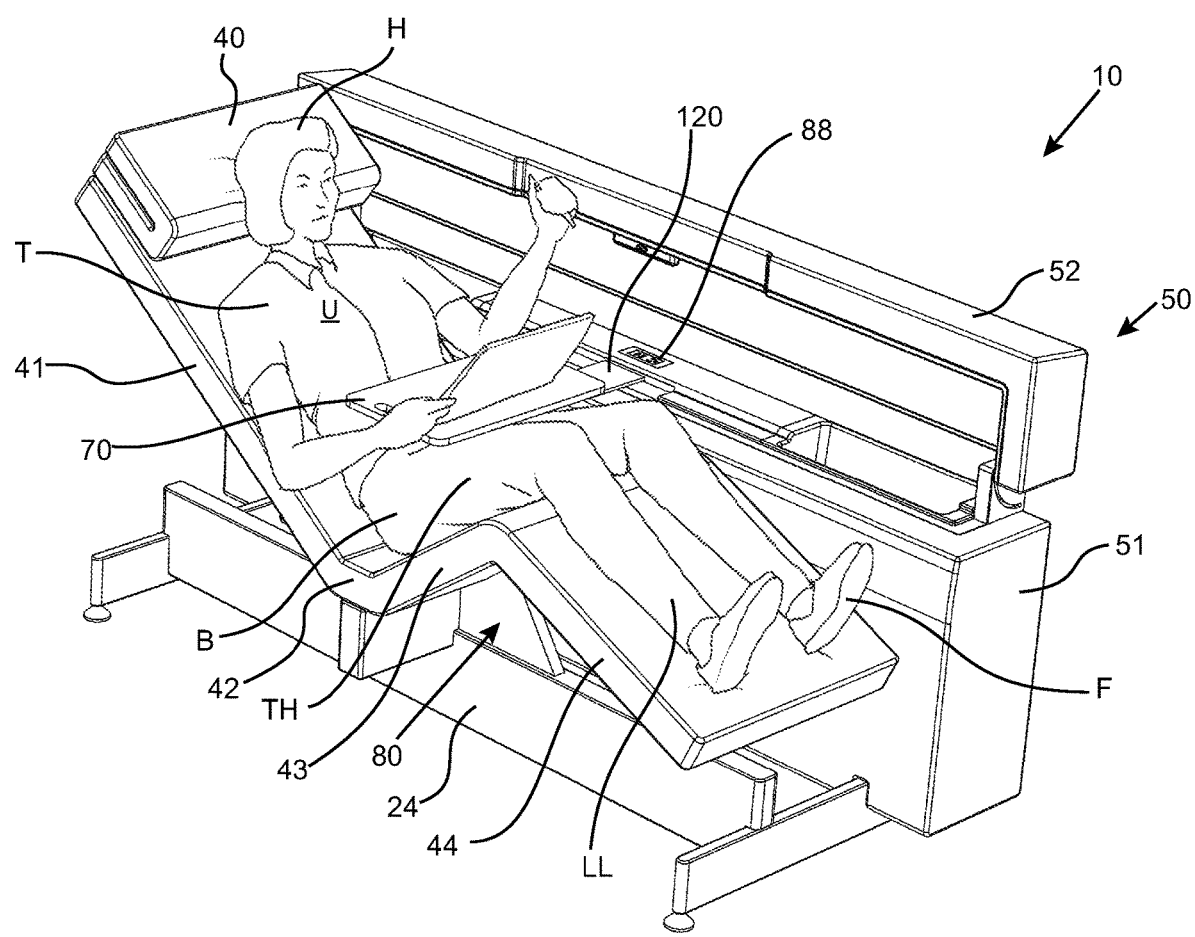
FIG. 8 is a top perspective view of the convertible lounge sofa system according to select embodiments of the instant disclosure, shown in use as a chaise lounge configuration with work station deployed and seat back open.

Referring now to FIGS. 7-8, by way of example, and not limitation, there is illustrated an example embodiment of a sofa convertible to a chaise lounge, convertible lounge sofa system 10, according to this select embodiment as a chaise lounge with second upper seat back segment 52 in the open mode with deployable work surface 70 deployed. Convertible lounge sofa system 10 may include a planar segmented seat bench, such as sofa seat bottom assembly 30 supported by and removeably affixed to sofa base 20, and more specifically supported by and removeably affixed to center beam 24 of sofa base 20. Sofa seat bottom assembly 30 may be segmented to enable different in line segments of sofa seat bottom assembly 30 to tilt, raise, or lower to provide 90 degrees user U turn into a chaise lounge position, having a back support segment, such as first sofa seat assembly 41 may be angled A1 up to provide upright support for the torso T or back of user U, a center or connector support segment, such as second sofa seat assembly 42, affixed preferably to center beam 24, to support the buttocks B of user U. It is recognized that user U head H may be positioned on dual use armrest/headrest 40. It is contemplated herein that first sofa seat assembly 41 may be hinged to second sofa seat assembly 42 to enable first sofa seat assembly 41 to be tilted or angled A1 up to provide upright support for the torso T or back of user U in the chaise lounge mode.

Moreover, a seat pan segment, such as third sofa seat assembly 43 may be angled A2 upward to provide upright support or cradle the upper leg or thigh TH of user U, to support the upper leg or thigh TH of user U. It is contemplated herein that third sofa seat assembly 43 may be hinged to second sofa seat assembly 42 opposite side for first sofa seat assembly 41 to enable third sofa seat assembly 43 to be angled A2 up to cradle the upper leg or thigh TH of user U in the chaise lounge mode.

Furthermore, a lower leg support segment, such as fourth sofa seat assembly 44 may be angled A3 down to provide downward angled to support for lower leg LL and feet F of user U. It is contemplated herein that fourth sofa seat assembly 44 may be hinged to third sofa seat assembly 43 opposite side for second sofa seat assembly 42 to enable fourth sofa seat assembly 44 to be angled A3 down to support the lower leg LL or feet F of user U in the chaise lounge mode.

It is recognized herein that hinged encompasses all forms of allowing on first sofa seat assembly 41, second sofa seat assembly 42, third sofa seat assembly 43, and fourth sofa seat assembly 44 to be hingedly connected, rotate, pivot or slide relative to its neighboring segment(s).

It is recognized herein that user U positioned on first sofa seat assembly 41, second sofa seat assembly 42, third sofa seat assembly 43, and fourth sofa seat assembly 44 in the chaise lounge mode may utilize and have easy access to close proximity placed deployable work surface 70 positioned perpendicular to seat back console 50, seat back segment armrest 86, lighting features 82 to illuminate seat back console 50, storage pockets 84, and deployable work surface 70, power/data port feature 88, such as AC & USB power, data ports, chargers, etc.

It is important to note that alternative embodiments are recognized herein which could have less complex segment articulations. For instance, it is conceivable that third sofa seat assembly 43 and fourth sofa seat assembly 44 segments could be fixed. Additionally sofa seat bottom assembly 30 could be segmented like sofa seat assemblies could be a basic sofa bench with cushions that are manually arranged to support the user as needed in the chaise lounge position.

First lower seat back segment 51 or center beam 24 may contain or carry some or all of mechanism 80 used to adjust/convert first sofa seat assembly 41, second sofa seat assembly 42, third sofa seat assembly 43, and fourth sofa seat assembly 44, the sofa seat bottom segments into the chaise lounge position shown in FIG. 8. It is recognized herein that mechanism 80 may include manual power, electrical actuators, hydraulic, compressed air or the like to create a force of movement to raise and lower first sofa seat assembly 41, second sofa seat assembly 42, third sofa seat assembly 43, and fourth sofa seat assembly 44, the sofa seat bottom segments to move first sofa seat assembly 41, second sofa seat assembly 42, third sofa seat assembly 43, and fourth sofa seat assembly 44, the sofa seat bottom segments between sofa seat shown in FIG. 2 and chase lounge shown in FIG. 8.

It is recognized herein that a user can translate deployable work surface 70 laterally (fore & aft) relative to the chaise lounge position.

An alternative embodiment would be to use the base structure, such as center beam 24, to store cushions or pillows used to position the user U into the chaise lounge position.

The features in FIGS. 7-8 coupled with the symmetrical nature of seat back console 50 allows the sofa seat bottom assembly, lower first sofa seat assembly 41, second sofa seat assembly 42, third sofa seat assembly 43, and fourth sofa seat assembly 44, to be installed as either in a right or left hand chaise lounge orientation.

Convertible lounge sofa system 10 may include a planar segmented seat bench, such as sofa seat bottom assembly 30. Sofa seat bottom assembly 30 may be configurable thereto a side facing chaise lounge seat having a back support segment, a center segment, a seat pan segment, and a lower leg support segment, (lower first sofa seat assembly 41, second sofa seat assembly 42, third sofa seat assembly 43, and fourth sofa seat assembly 44), seat back console 50 supported by sofa base 20.

Figure 9:
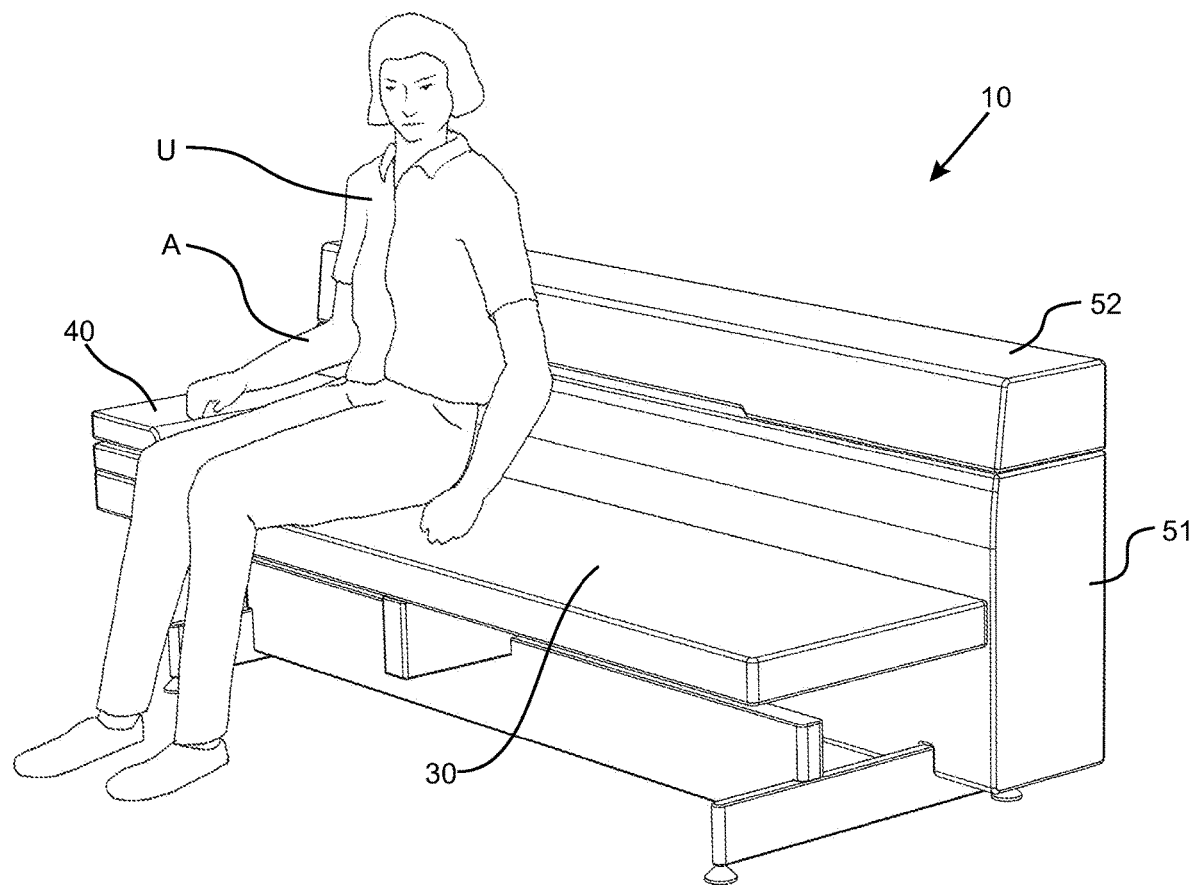
FIG. 9 is a perspective view of the convertible lounge sofa system according to select embodiments of the instant disclosure, shown in use as a sofa configuration with seat back closed.

Referring now to FIG. 9, by way of example, and not limitation, there is illustrated an example embodiment of convertible lounge sofa system 10, according to this select embodiment with user U seated on sofa seat bottom assembly 30 in sofa mode with second upper seat back segment 52 in the closed position with deployable work surface 70 stored. User U may place hand and arm A on dual use armrest/headrest 40

Referring now to FIG. 10, by way of example, and not limitation, there is illustrated another example embodiment of convertible lounge sofa system 10, according to this select embodiment with second upper seat back segment 52 shown in an open position. First lower seat back segment 51 may include a slider connection or a linear bearing approach, such as linear motion assembly 100. Linear motion assembly 100 may include first seat back extension 61A and second seat back extension 62A, each extending vertically up therefrom and positioned opposite one another on first seat back segment 51. Moreover, linear motion assembly 100 may include first seat back slider arm 101 and second seat back slider arm 102, each extending down therefrom and positioned opposite one another on second seat back segment 52. In use, first seat back extension 61A and first seat back slider arm 101, and second seat back extension 62A and second seat back slider arm 102, respectively may be slidably moved relative to one another to enable second upper seat back segment 52 to linearly move about first lower seat back segment 51 between an open position and a closed position.

It is further contemplated herein that second upper seat back segment 52 of seat back console 50 may be utilized to provide privacy.

Figure 11A:
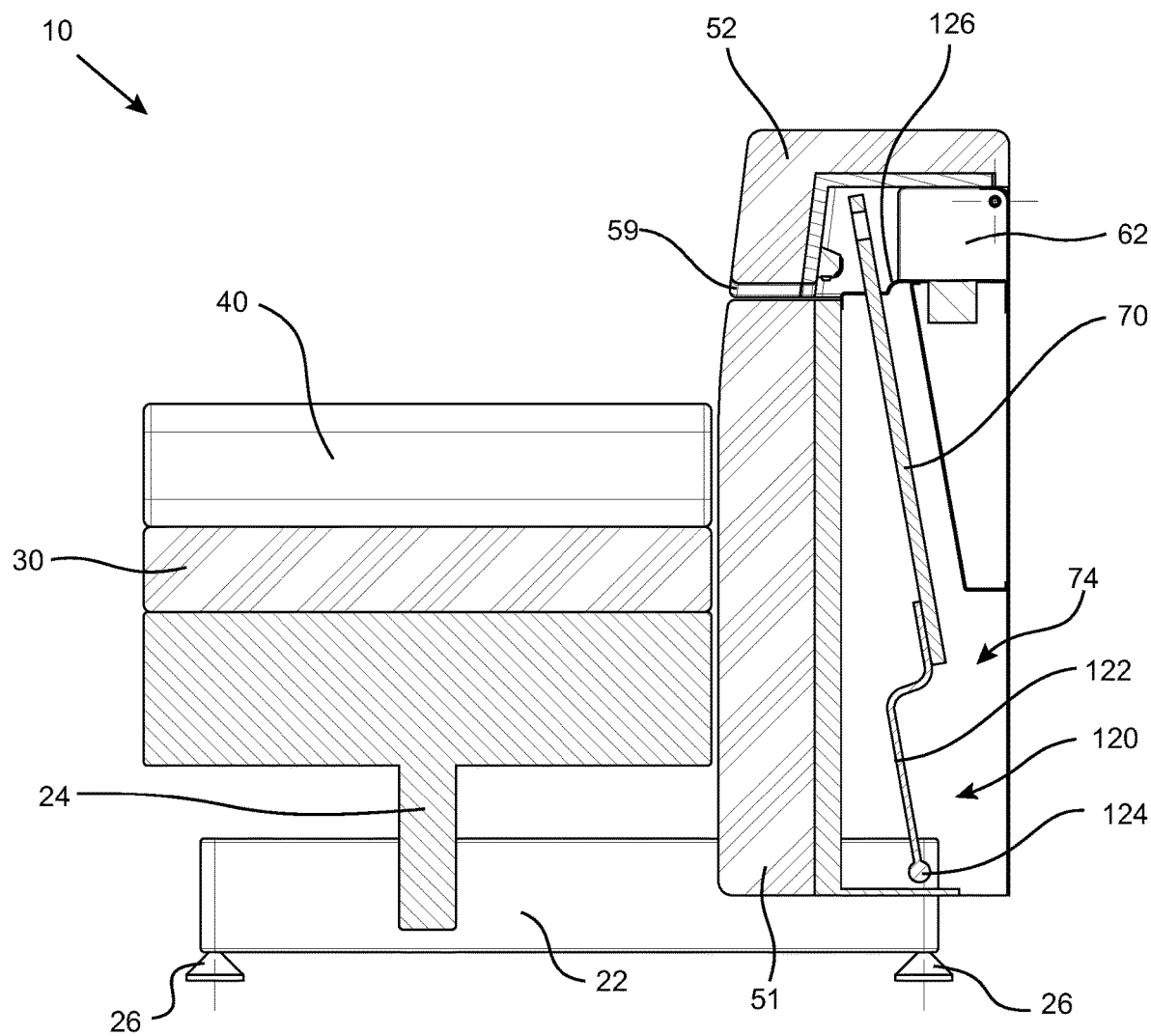
FIG. 11A is a cross sectional side view of the convertible lounge sofa system according to select alternate embodiments of the instant disclosure, shown in a sofa configuration with work station stored and seat back closed.
Figure 11B:
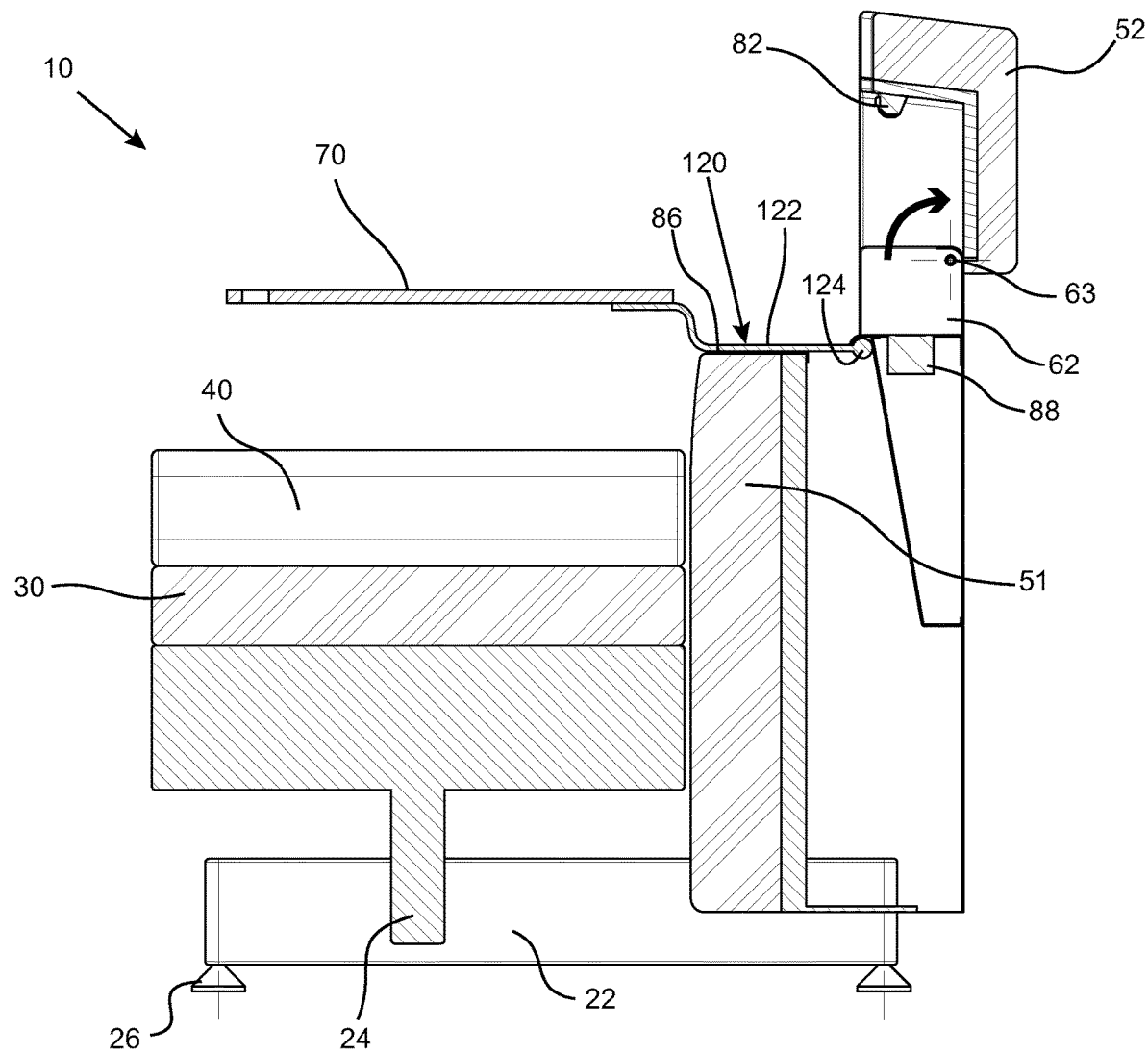
FIG. 11B is a cross sectional side view of the convertible lounge sofa system according to select alternate embodiments of the instant disclosure, shown in a sofa configuration with work station deployed and seat back open.

Referring now to FIGS. 11A and 11B, by way of example, and not limitation, there is illustrated an example embodiment of convertible lounge sofa system 10, according to this select embodiment as a sofa with second upper seat back segment 52 in the closed/open mode with deployable work surface 70 stored/deployed, respectively. Referring again to FIG. 11A, by way of example, and not limitation, there is illustrated an example embodiment of convertible lounge sofa system 10, according to this select embodiment as a sofa with second upper seat back segment 52 in the closed mode with deployable work surface 70 stored, stowed, or tucked therein storage pockets 74. Referring again to FIG. 11B, by way of example, and not limitation, there is illustrated an example embodiment of convertible lounge sofa system 10, according to this select embodiment as a sofa with second upper seat back segment 52 in the open mode with deployable work surface 70 deployed therefrom work surface storage pocket 74. Deployable work surface 70 may include a deployment and holding mechanism, such as work surface attachment device 120 affixed to a backend of deployable work surface 70, such as work surface extension arm 122 having a latch mechanism on one end, such as bar 124. Moreover, a catch, such as collar 126 may be utilized to receive bar 124 and collar 126 may be positioned therebetween first seat back extension 61A and second seat back extension 62A proximate work surface storage pocket 74. It is contemplated herein that deployable work surface 70 may be deployed via sliding deployable work surface 70 from work surface storage pocket 74 until bar 124 catches collar 126 and work surface extension arm 122 rest thereon first seat back segment armrest 86 or an internal dedicated stop in the mechanism.

It is contemplated herein that attachment device 120 may include hook and loop, clasp, slot, hook or other like attachment devices.

It is contemplated herein that convertible lounge sofa system 10 components may be constructed of wood, aluminum, particle board, or the like and of different dimensions. This and other materials herein may be constructed of metal, steel, aluminum, alloy, or plastic or more specifically high density polyethylene or similar high tensile or strengthened materials, as these material offers a variety of forms and shapes and provide strength with reduced weight; however, other suitable materials or the like, can be utilized, provided such material has sufficient strength and/or durability as would meet the purpose described herein to enable convertible lounge sofa system 10 to be unfolded into a chaise lounge.

It is understood herein that various changes in the material used, shape, size, arrangement of parts, and parts are connected with bolts, pins, screws or similar fasteners or hinges or other rotating devices without departing from the spirit of the scope of the claims herein.

It is further understood herein that the parts and elements of this disclosure may be located or position elsewhere based on one of ordinary skill in the art without deviating from the present disclosure.

Figure 12:
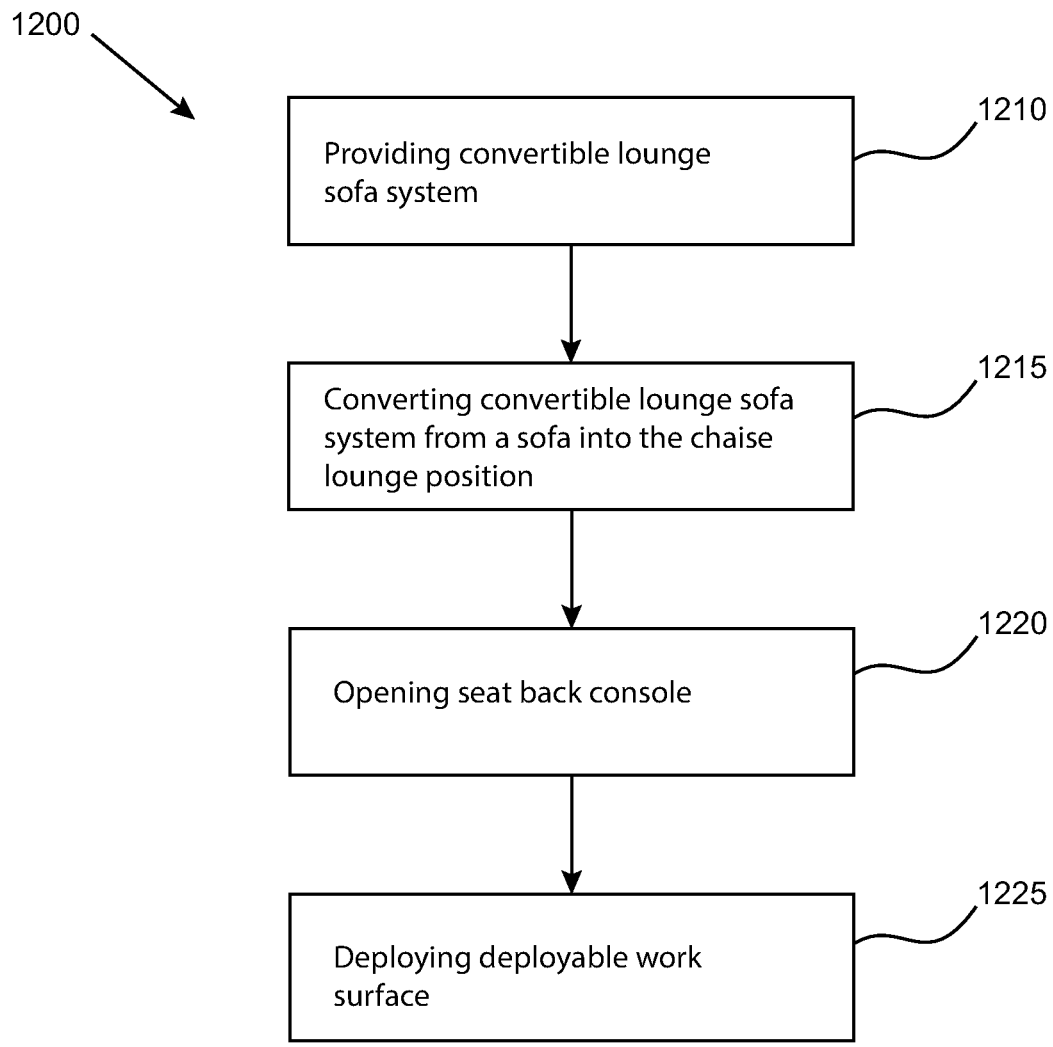
FIG. 12 is a flow diagram depicting conversion and use of convertible lounge sofa system.

Referring now to FIG. 12, there is illustrated a flow diagram 1200 of a method of seating utilizing convertible lounge sofa system 10 as a method of converting a sofa to a side facing chase lounge for use by a user to support a head, a torso, a buttocks, an upper leg, a lower leg and feet. In block or step 1210, providing convertible lounge sofa system 10, as described above in FIGS. 1-11. In block or step 1215, converting convertible lounge sofa system 10 from a sofa, sofa seat bottom assembly 30 shown in FIG. 9 to an in line chaise lounge by adjust/convert/sliding/tilting first sofa seat assembly 41, second sofa seat assembly 42, third sofa seat assembly 43, and fourth sofa seat assembly 44, the sofa seat bottom segments into the chaise lounge position shown in FIG. 8. In block or step 1220, opening or raising seat back console 50 whether second upper seat back segment 52 may hinge from first lower seat back segment 51 or second upper seat back segment 52 may separate from first lower seat back segment 51 by lifting second upper seat back segment 52 upwards from first lower seat back segment 51 to provide user U access to seat back segment armrest 86, lighting features 82 to illuminate seat back console 50, storage pockets 84, and deployable work surface 70, power/data port feature 88, such as AC & USB power, data ports, chargers, etc. In block or step 1225, deploying deployable work surface 70 from work surface storage pocket 74 of seat back console 50.

Figure 13:
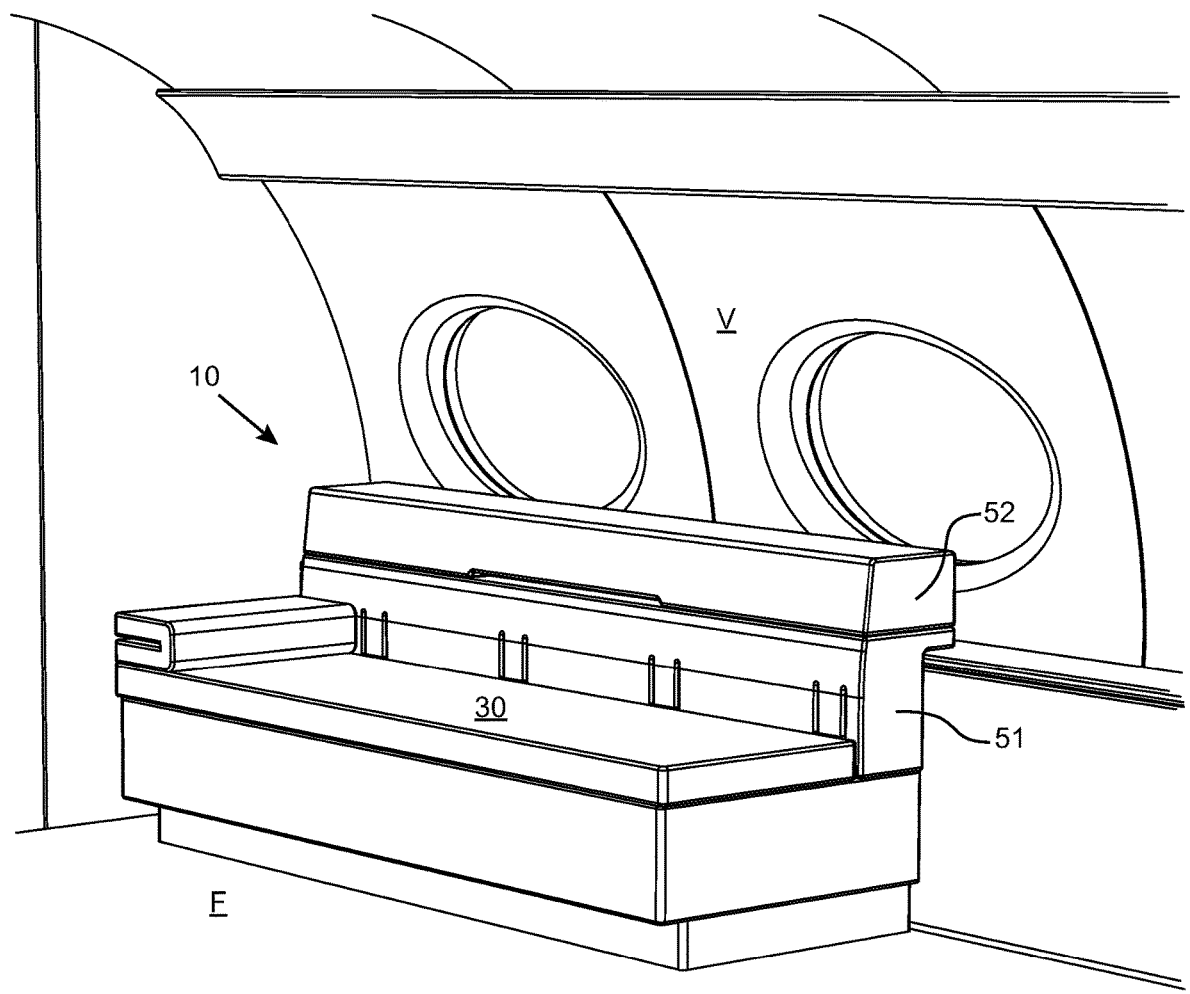
FIG. 13 is a perspective view of the convertible lounge sofa system according to select embodiments of the instant disclosure, shown in use as a sofa configuration with seat back closed and installed in a vehicle.

Referring now to FIG. 13, by way of example, and not limitation, there is illustrated an example embodiment of convertible lounge sofa system 10, according to this select embodiment shown installed in a vehicle V, such as an airplane. The configuration allows the sofa to be used or installed into spaces which otherwise would not have sufficient space to accommodate these functions with the current state of the art. Besides use in space challenged residential or commercial environments the invention could also be configured into business aircraft and various forms of air, water, road and rail vehicles, including airplane, automobile, truck, bus, train, boat, or like modes of transportation (vehicle V), where the need for multiuse adaptability is important and small foot print is available.

Figure 14:
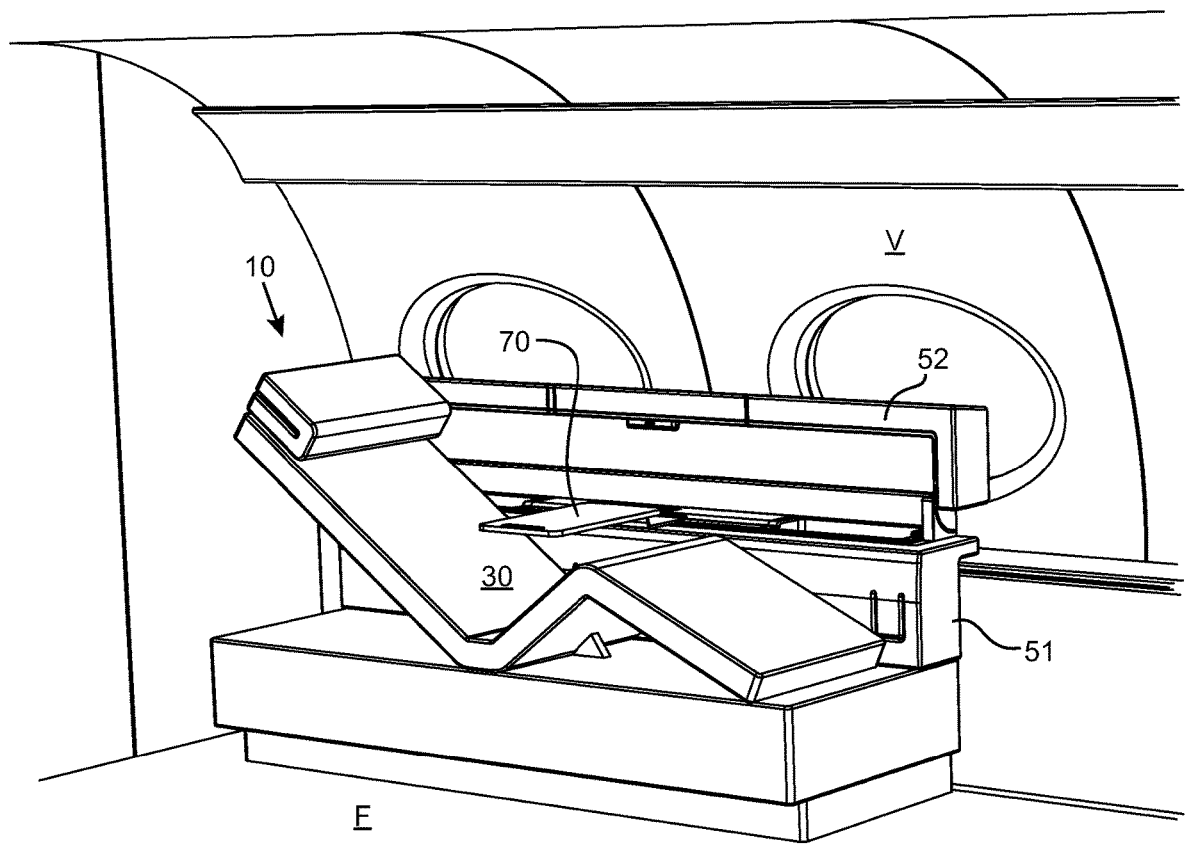
FIG. 14 is a perspective view of the convertible lounge sofa system according to select embodiments of the instant disclosure, shown in use as a chaise lounge configuration with seat back open, work station deployed, and installed in a vehicle.

Referring now to FIG. 14, by way of example, and not limitation, there is illustrated an example embodiment of convertible lounge sofa system 10, according to this select embodiment shown installed in a vehicle V, such as an airplane. Convertible lounge sofa system 10 according to this select embodiment is shown as a chaise lounge with second upper seat back segment 52 in the open mode with deployable work surface 70 deployed. The configuration allows the chaise lounge to be used or installed into spaces which otherwise would not have sufficient space to accommodate these functions with the current state of the art. Besides use in space challenged residential or commercial environments the invention could also be configured into business aircraft and various forms of air, water, road and rail vehicles, including airplane, automobile, truck, bus, train, boat, or like modes of transportation (vehicle V), where the need for multiuse adaptability is important and small foot print is available.

Figure 15:
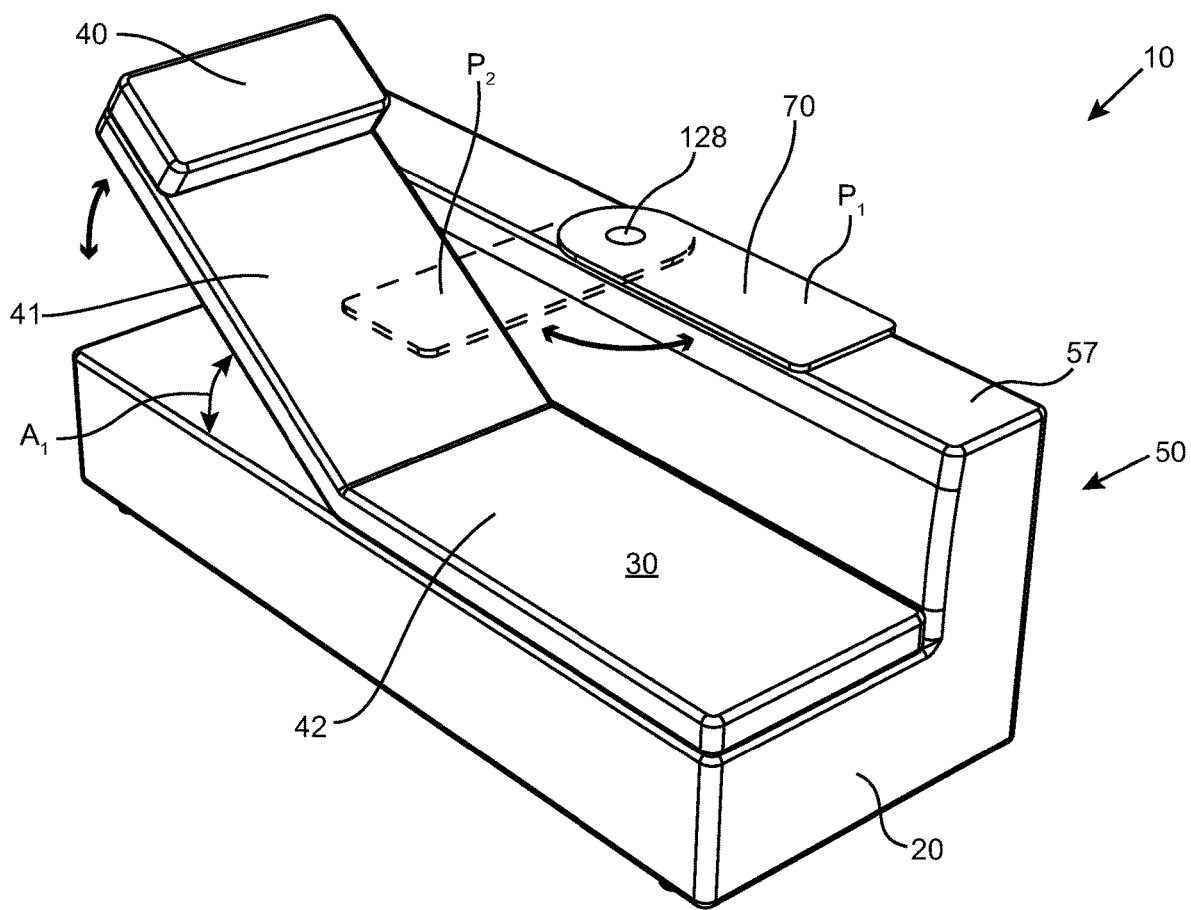
FIG. 15 is a perspective view of the convertible lounge sofa system according to another select embodiment of the instant disclosure, shown in use as a chaise lounge configuration with work station deployed.

Referring now to FIG. 15, by way of example, and not limitation, there is illustrated an example alternate embodiment of a sofa convertible to a chaise lounge, convertible lounge sofa system 10. Sofa seat bottom assembly 30 may be segmented to enable different in line segments of sofa seat bottom assembly 30 to tilt, raise, or lower to provide 90 degrees user U turn into a chaise lounge position, having a back support segment, such as first sofa seat assembly 41 may be angled A1 up relative to second sofa seat assembly 42, affixed or supported preferably to sofa base 20, to support the buttocks B, an upper leg or thigh TH, lower leg LL and feet F of user U, as shown in FIG. 8. It is recognized that user U head H may be positioned on dual use armrest/headrest 40. It is contemplated herein that first sofa seat assembly 41 may be hinged to second sofa seat assembly 42 to enable first sofa seat assembly 41 to be tilted or angled A1 up to provide upright support for the torso T or back of user U in the chaise lounge mode. Moreover, deployable work surface 70 may be deployed by rotating deployable work surface 70 about work station pin 128 affixed thereto seat back upper surface 57 of seat back console 50, from first position P1 stowed to second position P2 in use.

The resulting configurations will allow the sofa to seat 1 to 3 or more people in a typical sofa manner or allow user U to sit and turn 90 degrees in a chaise lounge position either through a mechanized seat pan frame or through throw pillows and open the sofa seat back to access the above stated features.

With respect to the above description then, it is to be realized that the optimum dimensional relationships, to include variations in size, materials, shape, form, position, movement mechanisms, function and manner of operation, assembly and use, are intended to be encompassed by the present disclosure.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein but is limited only by the following claims.

The invention claimed is:

1. A sofa, said sofa comprising:
   a sofa base;
   a sofa seat bottom supported by said sofa base, said sofa seat bottom having a dual use armrest/headrest positioned on one end; and
   a seat back console supported by said sofa base and positioned adjacent said sofa seat bottom, said seat back console having a first lower seat back segment and a second upper seat back segment configured to be opened, said seat back console having therein a deployable work surface;
   wherein said seat back console is configured having a slot therebetween said first lower seat back segment and said second upper seat back segment to deploy said deployable work surface perpendicular to said seat back console in a closed position.

2. The sofa of claim 1, wherein said seat back console is configured having at least one of a storage feature, a power/data feature, a lighting feature, and combinations thereof.

3. The sofa of claim 1, wherein said first lower seat back segment of said seat back console is configured having a an armrest when said second upper seat back segment is in an open position.

4. The sofa of claim 1, wherein said seat back console further comprises a seat back hinge assembly positioned between said first lower seat back segment and said second upper seat back segment.

5. The sofa of claim 4, wherein said seat back hinge assembly traverses a longitudinal axis of said first lower seat back segment.

6. The sofa of claim 1, wherein said seat back console further comprises a linear linkage assembly positioned between said first lower seat back segment and said second upper seat back segment.

7. The sofa of claim 1, wherein said seat back console further comprises a work surface storage pocket to stow said deployable work surface.

8. The sofa of claim 1, wherein said deployable work surface is configured having a handle positioned proximate a front end of said deployable work surface.

9. The sofa of claim 1, wherein said deployable work surface is configured having an articulating arm, said articulating arm having a first arm end and second arm end, said first arm end is affixed to said first lower seat back segment and said second arm end extends from said first lower seat back segment through said slot to affix to said deployable work surface.

10. The sofa of claim 1, wherein said sofa seat bottom is segmented having a back support segment, a center segment, a seat pan segment, a lower leg support segment configurable as a side facing chaise lounge seat.

11. The sofa of claim 1, wherein said sofa base is affixed to a vehicle.

12. A sofa convertible to a side facing chaise lounge for use by a user to support a head, a torso, a buttocks, an upper leg, a lower leg and a foot, said sofa comprising:
a sofa base;
a sofa seat bottom supported by said sofa base, said sofa seat bottom having a dual use armrest/headrest positioned on one end, wherein said sofa seat bottom is segmented having a first sofa seat assembly to support the torso, a second sofa seat assembly to support the buttocks, a third sofa seat assembly to support the upper leg, and a fourth sofa seat assembly to support the lower leg convertible to the side facing chaise lounge; and
a seat back console supported by said sofa base and positioned adjacent said sofa seat bottom, said seat back console having a first lower seat back segment and a second upper seat back segment configured to be opened.

13. The sofa of claim 12, wherein said second sofa seat assembly is affixed to said sofa base.

14. The sofa of claim 13, wherein said first sofa seat assembly is hinged to said second sofa seat assembly to enable said first sofa seat assembly to be tilted to provide upright support for the torso.

15. The sofa of claim 12, wherein said third sofa seat assembly is hinged to said second sofa seat assembly to enable said third sofa seat assembly to be tilted to provide upright support for the upper leg.

16. The sofa of claim 15, wherein said fourth sofa seat assembly is hinged to said third sofa seat assembly third sofa seat assembly to enable said fourth sofa seat assembly to be tilted to provide downward support for the lower leg.

17. The sofa of claim 12, wherein said seat back console is configured having a slot therebetween said first lower seat back segment and said second upper seat back segment to deploy a deployable work surface perpendicular to said seat back console in a closed position.

18. The sofa of claim 12, wherein said seat back console is configured having at least one of a storage feature, a power/data feature, a lighting feature, and combinations thereof.

19. The sofa of claim 12, wherein said first lower seat back segment of said seat back console is configured having an armrest for the side facing chaise lounge when said second upper seat back segment is in an open position.

20. The sofa of claim 12, wherein said seat back console further comprises a seat back hinge assembly positioned between said first lower seat back segment and said second upper seat back segment.

21. The sofa of claim 20, wherein said seat back hinge assembly traverses a longitudinal axis of said first lower seat back segment.

22. The sofa of claim 12, wherein said seat back console further comprises a linear linkage assembly positioned between said first lower seat back segment and said second upper seat back segment.

23. The sofa of claim 17, wherein said seat back console further comprises a work surface storage pocket to stow said deployable work surface.

24. The sofa of claim 17, wherein said deployable work surface is configured having a handle positioned proximate a front end of said deployable work surface.

25. The sofa of claim 17, wherein said deployable work surface is configured having an articulating arm, said articulating arm having a first arm end and second arm end, said first arm end is affixed to said first lower seat back segment and said second arm end extends from said first lower seat back segment through said slot to affix to said deployable work surface.

26. The sofa of claim 12, wherein said sofa base is affixed to a vehicle.

27. A method of converting a sofa to a side facing chaise lounge for use by a user to support a head, a torso, a buttocks, an upper leg, a lower leg and a foot, said method comprising the steps of:
providing a sofa base, a sofa seat bottom supported by said sofa base, said sofa seat bottom having a dual use armrest/headrest positioned on one end, wherein said sofa seat bottom is segmented having a first sofa seat assembly to support the torso, a second sofa seat assembly to support the buttocks, said second sofa seat assembly is affixed to said sofa base, and said first sofa seat assembly is hinged to said second sofa seat assembly, a third sofa seat assembly to support the upper leg, said third sofa seat assembly is hinged to said second sofa seat assembly, a fourth sofa seat assembly to support the lower leg, said fourth sofa seat assembly is hinged to said third sofa seat assembly third sofa seat assembly, a seat back console supported by said sofa base and positioned adjacent said sofa seat bottom, said seat back console having a first lower seat back segment and a second upper seat back segment configured to be opened;
tilting said first sofa seat assembly to provide upright support for the torso;
tilting said third sofa seat assembly to provide upright support for the upper leg; and
tilting said fourth sofa seat assembly to provide downward support for the lower leg, wherein said sofa seat bottom is convertible to the side facing chaise lounge.

28. The method of claim 27, raising said second upper seat back segment to access at least one of a storage feature, a power/data feature, a lighting feature, and combinations thereof.

29. The method of claim 27, raising said second upper seat back segment to access a deployable work surface stowed therein.

30. The method of claim 29, deploying said deployable work surface to a position perpendicular to said seat back console.

31. The method of claim 27, raising said second upper seat back segment to access an armrest.

* * * * *